United States Patent Office 2,810,583
Patented Oct. 22, 1957

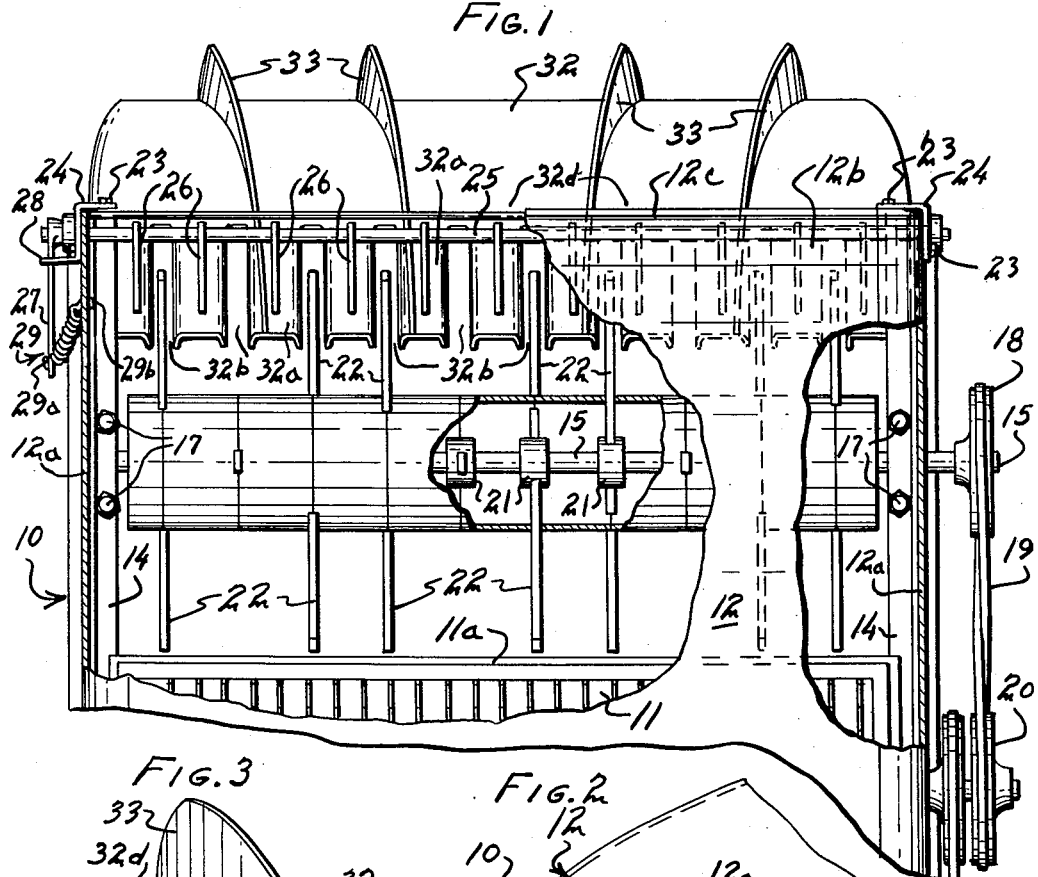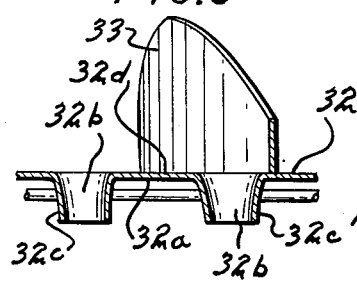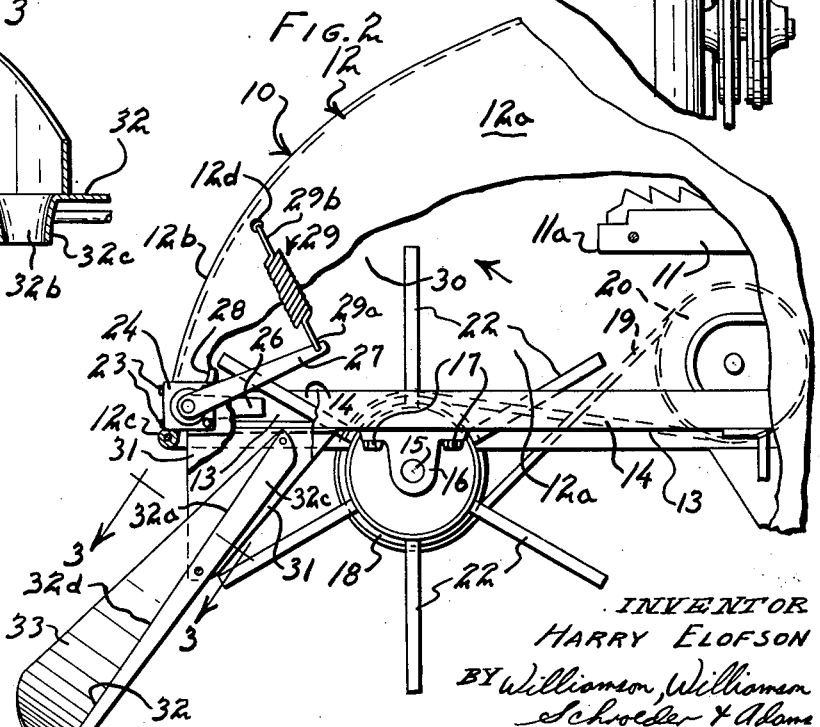

2,810,583

READILY ATTACHABLE AND DETACHABLE STRAW DISINTEGRATING AND SCATTERING DEVICE

Harry Elofson, Grand Forks, N. Dak.

Application November 5, 1954, Serial No. 467,068

7 Claims. (Cl. 275—3)

This invention relates to harvesting machines such as combines from which stalks, straw and the like are discharged. More particularly, it relates to mechanism for scattering straw being discharged from such machines.

Many devices have been designed in recent years for the disintegration and scattering of straw after it has passed through a combine. These devices normally provide separate disintegrating and scattering mechanisms and generally require the addition of a substantial amount of structure to the combine. Most of these devices require serious modification to the combine in the form in which it is sold by the manufacturer. There is a strong need for a very simple but efficient attachment, which when secured to the combine, will disintegrate the straw efficiently, will spread the disintegrated material effectively, which is inexpensive in construction and operation and will avoid plugging during its operation and which is, at the same time, readily attachable and removable so that it may or may not be used as desired and the change can be quickly and easily effected. Many farmers at times desire to use the combine in the form in which it is normally sold by the manufacturer which will without modification throw the straw into a single windrow and at other times desire to disintegrate the straw and scatter it uniformly over a relatively wide area. Thus it can be seen that it is strongly desirable that a simple disintegrator and scattering mechanism be provided which can be easily applied to the combine without serious modification thereto and without substantial effort and consumption of time and which may be just as easily removed so that the combine may function as intended by the manufacturer. My invention is directed toward providing a mechanism which will meet these requirements.

It is a general object of my invention to provide a novel and improved stalk and straw disintegrator of inexpensive construction and operation which may be readily attached to or detached from the combine.

A more specific object is to provide a novel and improved straw and stalk disintegrator of inexpensive construction and operation which will utilize the rearward momentum already imparted to the straw by the combine to augment that supplied by the disintegrating mechanism in order to more efficiently and effectively complete the disintegrating operation.

Another object is to provide a novel and improved straw and stalk disintegrator and scattering mechanism for a combine and the like which will simultaneously utilize the rearward momentum already imparted to the straw by the combine along with the momentum imparted to the straw by its rotary straw breaking mechanism and will utilize the combined momentum in cooperation with a simple and inexpensive attached panel to provide a highly effective scattering and dissemination of the straw over a relatively wide area.

Another object is to provide an improved straw disintegrating attachment for combines which will require no serious or costly modification of the combines preparatory to the attachment of the same thereto and which can be removed with a minimum of effort to enable the combine to be used in the manner for which it was originally designed.

Another object is to provide a novel straw disintegrating and scattering mechanism which will utilize the power of the combine more efficiently and thereby make possible a more effective and efficient distribution of the straw over a wide area behind the combine without providing power driven scattering means which is more costly to operate.

These and other objects and advantages of my invention will more fully appear from the following description made in connection with the accompanying drawings, wherein like reference characters refer to the same or similar parts through the several views, and in which:

Fig. 1 is a plan view of one embodiment of my invention attached to the rear and discharge portion of a combine with parts of the housing broken away to show the interior thereof;

Fig. 2 is a side elevational view of the same with a portion of the side panels of the housing removed to better show the interior and the relation of parts; and Fig. 3 is a fragmentary sectional view taken along line 3—3 of Fig. 2.

The straw delivery portion of a harvesting machine such as a combine is shown in the accompanying drawings, and as shown, may include a conventional type straw conveyor 11 which moves the straw rearwardly, a hood 12 and supporting structure 13. The supporting structure 13 is oftentimes in the form of an angle iron or a relatively heavy metal strap. The straw conveyor 11 in the form shown has a rearwardly extending discharge end 11a over which the straw travels in a rearward and outward direction. The hood 12 includes upstanding side walls 12a positioned laterally of and on opposite sides of the straw conveyor 11. In the form shown, hood 12 also includes an inclined top 12b which extends above the discharge conveyor 11 and to the rear thereof and is connected to side walls 12a. The top 12b of hood 12 slopes downwardly in an outward and rearward direction with respect to the conveyor 11. The hood 12 which extends outwardly and rearwardly from the discharge end 11a of the straw conveyor 11 defines a straw discharge passage through which the straw travels after being discharged from conveyor 11. In the form shown, the hood 12 has an open bottom 13.

Mounted to extend transversely across the discharge opening 13 of the combine 12 is a shaft 15. This shaft is secured to the combine and mounted for rotation about its longitudinal axis by means of a pair of bearings or journals 16 which may be readily secured by bolts 17 to the opposite angle irons 14 at opposite sides of the combine. A pulley 18 is carried by one end of the shaft 15 which extends laterally of the housing 12 and is driven by a V-belt 19 which in turn encircles and is driven by a pulley 20 in a conventional manner, the pulley 20 being driven by the source of power for the combine in a manner well known in the art.

Mounted at spaced intervals upon and along the length of the shaft 15 is a plurality of sleeves 21. These sleeves 21 are secured to the shaft in any conventional manner such as through the use of set screws or a key arrangement. Mounted on each of the sleeves 21 and extending radially outwardly therefrom is a pair of disintegrator elements such as the straw breaker arms 22. As best shown in Fig. 2 these breaker arms 22 swing during their rotation with the shaft 15 in close proximity to the rearwardmost parts 12c of the hood 12 which defines the discharge opening 13 of the combine.

Secured by a plurality of bolts such as 23 outside the housing to the outer surface of the supporting structure 13 at opposite sides of the combine and immediately adjacent to the portion 12c is a pair of journal plates 24. These journal plates 24 may be easily and quickly attached to or detached from the supporting structure 13. Mounted in these journal plates 24 for rotation relative thereto is a pivot rod 25 which extends transversely of the combine between the two journals 24 and through the supporting structure 13 in openings provided therefor. Fixedly secured to the pivot rod 25 for rotation therewith about the axis of the rod 25 and spaced along the length thereof is a plurality of spaced cooperating disintegrator elements or knives 26. As best shown in Fig. 2, these knives 26 extend forwardly from the rod 25 and are positioned behind the mounting structure rotatably carrying the shaft 15. They are relatively short and are capable of swinging downwardly from the horizontal position shown.

The end portions of the pivot rod 25 extend outwardly through the supporting structure 23 and fixedly secured to these end portions at each side of the combine is a torque lever 27. As shown, this torque lever extends forwardly and upwardly and is prevented from swinging upwardly by an outwardly protruding abutment member 28 carried by the journal plates 24. The forward end of the torque lever 27 is connected to a coil spring member 29 by a hooked lower end portion 29a. The upper end portion 29b of the spring member is also hooked, the hooked portion extending inwardly through an opening 12d provided therefor in the side panel 12a of the housing. In this manner the torque lever 27 and the knives 26 are constantly urged upwardly but they may swing downwardly to a position where the knives 26 will be outside the orbit indicated by the numeral 30 of the rotating breaker arms 22. Fixedly secured to the supporting structure 13 is a pair of generally triangularly shaped plates 31 which are arranged vertically and extend downwardly at opposite sides of the conveyor and from the supporting structure 13. Secured to and extending between these two plates 31 is a guiding panel 32. This panel may be formed, if desired and perhaps preferably, integrally with the side plates 31. It extends downwardly and rearwardly relative to the discharge defining portions of the combine and has a forward end portion 32a which extends forwardly into the orbit 30 of the rotating breaker arms 22 and outside the orbit of the swinging movement of the knives 26. The forward portion 32a of the panel 32 has slots or passages 32b formed therein at spaced intervals comparable to the spacing of the breaker arms 22 and directly behind the same to permit the breaker arms 22 while rotating to swing therethrough. The panel 32 is preferably slotted and formed so that the slot defining portions 32c are bent downwardly and parallel to each other to provide added strength for the panel 32.

Mounted upon the upper surface 32d of the guiding panel 32 is a plurality of guiding elements or fins 33. As best shown in Fig. 1, these fins 33 diverge rearwardly and extend downwardly along with the panel 32. However, the fins 33 are tapered at their forward portions so that they extend upwardly from the upper surface 32d of the panel 32 a substantially greater distance adjacent their rearward end portions than at their forward end portions at the forward portion 32a of the panel. The plates 31 are secured by bolts 31a and 31b to the supporting structure 13 and since these bolts may be readily removed, the panel may be quickly and easily detached from the combine.

In operation the straw is moved rearwardly over the rearward end 11a of the straw conveyor 11 and has imparted thereto a rearward momentum through the normal gyratory action of the conveyor 11. The breaker arms 32 rotate in the direction of the arrows shown in Fig. 2 and thus the breaker arms 22 in their overpassing arc of rotation engage straw and progress it rearwardly substantially in the initial direction of travel of the straw. Each of the arms 22 propel the straw in a substantial continuity of direction so as to move it rearwardly and then downwardly against the rotatable cutter knives 26. The breaker arms 22 rotate very rapidly and if the straw is relatively dry, a substantial portion of it will be broken before it ever reaches the cutter knives 26. However, if the straw is relatively damp and therefore tough, the cooperation between the knives 26 and the breaker arms 22 is more than sufficient to disintegrate the straw and chop it into relatively small pieces.

It will be noted that the breaker arms 22 as they engage the straw discharged from the conveyor 11 utilize the rearward momentum already imparted to the straw by the conveyor 11 and augments it. Thus there is no loss of power caused by change in direction of the movement of the straw as would be necessary if the breaker arms 22 rotated in the opposite direction. Thus it can be seen that a substantially less requirement of power is made for the disintegration of the straw.

The breaker arms 22, in addition to cooperating with the cooperating knives 26 to disintegrate the straw, also drive the pieces of straw rapidly downwardly past these knives and upon the upper surface 32d of the panel 32. These breaker arms 26 impart a strong downward and rearward thrust to the disintegrated straw along lines substantially tangential to the orbit of the breaker arms 22. The angulation of the panel 32 is such that a very rapid downward movement is imparted to the pieces of straw by the breaker arms 22 so that they will be flung a very substantial distance laterally when they are caused to diverge and scatter by the upstanding fins 33. These fins 33 in cooperation with the breaker arms 22 cause the disintegrated straw to be scattered over a relatively wide area to both sides of the combine. The high velocity of the disintegrated straw is at least partly the result of the combination of the momentum applied to the straw by the conveyor 11 and the breaker arms 22 and thus a more effective spreading is accomplished as a result of the utilization of these combined momentums.

Through the utilization of the combined momentum applied to the straw by the conveyor 11 and the breaker arms 22, I have found it possible to utilize a scattering and guiding element which may be of an inert nature rather than power driven as is normally the case in other similar devices. In other devices where provision is not made for utilization of the combined momentum, excessive or additional power is required to accomplish an effective scattering function.

When a unusually wet or otherwise tough clump of straw comes through the combine and is discharged from the conveyor 11 into the path of the breaker arms 22, it will be carried around to where it will be engaged by the knives 26 in cooperation with the arms. If the clump is too tough to be cut, the spring 29 will extend sufficiently to permit the knives 26 to swing downwardly and out of the orbit of the breaker arms 22, thus permitting the clump of straw to pass through and be discharged upon the ground without plugging the combine as would be the case if the knives were not swingably mounted.

It will be noted by reference to Fig. 2 that the panel 32 extends in a plane approaching normal to the length of the beater arms 22 as the passages in the panel. The angle exceeds 60° and thus the thrust exerted upon the disintegrated straw by the beater arms as they pass downwardly has a strong tangential component.

It will also be noted that the entire straw disintegrating and scattering mechanism can quickly and easily be removed from the combine when desired by removing the bolts holding the bearings 16, the panel 32, and the pivot plates 24. When these bolts are removed, the entire device can be taken off the combine and it may then be used to drop the straw in single windrows for subsequent baling or other desired purposes.

Thus it can be seen that I have provided a relatively simple straw disintegrating and scattering device which can be manufactured quite inexpensively and which can be quickly and simply attached to or detached from a combine without any serious modification to the combine preparatory to its attachment. It is only necessary to drill a total of three holes at each side of the combine and thereafter my straw disintegrating and scattering mechanism may be quickly and readily attached thereto. Likewise it may be quickly and easily removed therefrom in the event that the owner of the combine wishes to utilize the combine to simply windrow the straw in a straight line behind its line of travel.

It will, of course, be understood that various changes may be made in the form, details, arrangement and proportions of the various parts without departing from the scope of my invention.

What is claimed is:

1. A stalk and straw disintegrating and scattering device for a harvesting machine such as a combine having a discharge portion, said device comprising a plurality of spaced rotary disintegrator elements, structure for mounting said elements upon such a machine for revolution in an orbit about a substantially horizontal axis extending transversely across the discharge portion of the machine and in position to engage the stalks and straw as they are discharged from the machine, a plurality of spaced cooperating disintegrator elements disposed behind said mounting structure and in cooperating position with said rotary disintegrator elements to cooperatively disintegrate such stalks and straw, and a straw guiding panel mounted adjacent to said cooperating disintegrator elements on the side thereof opposite to that from which said rotary disintegrator elements approach said cooperating disintegrator elements and extending downwardly and rearwardly therefrom, said panel having a forward portion extending forwardly into the orbit of said rotary disintegrator elements and having passages formed therein through which said rotary elements may pass, said panel having a plurality of laterally and rearwardly diverging guide elements formed on the upper surface thereof, the disintegrated straw being propelled rearwardly and downwardly by said rotary disintegrator elements upon said panel and between said guide elements and being spread by the latter upon a relatively wide area.

2. For use in the straw discharge portion of a harvesting machine having a conveyor for carrying straw in overlying relation thereto and in an outward direction, a straw disintegrating and scattering device comprising a plurality of spaced rotary disintegrator elements, structure for mounting said elements for rotation across the discharge portion of such a machine with each of said elements in its overpassing arc swinging outwardly from the discharge end of such a conveyor substantially in the direction of travel of the straw being discharged therefrom and each propelling in substantially continuity of direction the outwardly traveling straw therefrom, a plurality of spaced cooperating disintegrator elements disposed behind said mounting structure and in cooperating position with said rotary disintegrator elements to cooperatively disintegrate such stalks and straw when said rotary elements are rotated, and a straw guiding panel mounted adjacent to said cooperating disintegrator elements on the side thereof opposite to that from which said rotary disintegrator elements approach said cooperating disintegrator elements and extending downwardly and rearwardly therefrom, said guiding panel having a forward portion extending forwardly into the orbit of said rotary disintegrator elements and having passages formed therein through which said rotary elements may pass, said panel having a plurality of laterally and rearwardly diverging guide elements formed on the upper surface thereof, the disintegrated straw being propelled rearwardly and downwardly by said rotary disintegrator elements upon said panel and between said guide elements and being guided laterally by the latter to cause the same to be spread over a relatively wide area.

3. For use in the straw discharge portion of a harvesting machine having a conveyor for carrying straw in overlying relation thereto and in an outward direction, a straw disintegrating and scattering device comprising a plurality of spaced rotary disintegrator elements, structure for mounting said elements for rotation across the discharge portion of such a machine with each of said elements in its overpassing arc swinging outwardly from the discharge end of such a conveyor substantially in the direction of travel of the straw being discharged therefrom and each propelling in substantially continuity of direction the outwardly traveling straw therefrom, a plurality of spaced cooperating disintegrating elements disposed behind said mounting structure in cooperating position with said rotary disintegrator elements to cooperatively disintegrate such stalks and straw when said rotary elements are rotated, and a readily removable straw guiding panel removably mounted adjacent to said cooperating disintegrating elements on the side thereof opposite to that from which said rotary disintegrator elements approach said cooperating disintegrating elements and extending downwardly and rearwardly therefrom, said guiding panel having a forward portion extending forwardly into the orbit of said rotary disintegrator elements and having passages formed therein through which said rotary elements pass during their rotation, said panel having a plurality of laterally and rearwardly diverging guiding elements carried upon the upper surface thereof and extending upwardly therefrom, the disintegrated straw being propelled rearwardly and downwardly by said rotary disintegrator elements upon said panel and between said guide elements and being guided laterally by the latter to cause the same to be spread over a relatively wide area.

4. For use in the straw discharge portion of a harvesting machine having a conveyor for carrying straw in overlying relation thereto and in an outward direction, a straw disintegrating and scattering device comprising a plurality of spaced rotary disintegrator elements, structure for mounting said elements for rotation across the discharge portion of such a machine with each of said elements in its overpassing arc swinging outwardly from the discharge end of such a conveyor substantially in the direction of travel of the straw being discharged therefrom and each propelling in substantially continuity of direction the outwardly travelling straw therefrom, a plurality of spaced cooperating disintegrator elements mounted behind said mounting structure upon the discharge defining portions of the machine and extending forwardly therefrom in cooperating position with said rotary disintegrator elements to cooperatively disintegrate such stalks and straw when said rotary elements are rotated, and a straw guiding panel mounted below and adjacent to said cooperating disintegrating elements and extending downwardly and rearwardly relative thereto, said guiding panel having a forward portion extending forwardly into the orbit of said disintegrating elements and having passages formed therein through which said rotary elements pass while rotating, said panel having a plurality of laterally and rearwardly diverging guide elements carried upon the upper surface thereof, the disintegrated straw being propelled rearwardly and downwardly by said rotary disintegrator elements upon said panel and between said guide elements and being guided laterally by the latter to cause the same to be spread over a relatively wide area.

5. For use in the straw discharge portion of a harvesting machine having a conveyor for carrying straw in overlying relation thereto and in an outward direction, a straw disintegrating and scattering device comprising a plurality of spaced rotary disintegrator elements, mounting structure for mounting said elements for rotation across the discharge portion of such a machine with each of said elements in its overpassing arc swinging outwardly from the discharge end of such a conveyor substantially in the direction of travel of the straw being discharged therefrom and each propelling in substantially continuity of direction the outwardly travelling straw therefrom, a plurality of spaced cooperating disintegrating elements mounted behind said mounting structure adjacent the most rearward portions of the discharge defining structure of the machine in cooperating position with said rotary disintegrator elements to cooperatively disintegrate such stalks and straw when said rotary elements are rotated, said cooperating disintegrator elements being mounted for swinging motion to a position outside the orbit of said rotary disintegrator elements to non-cooperating position and being constantly resiliently urged toward cooperating position with said rotary elements, a straw guiding panel mounted below said cooperating disintegrator elements and behind said mounting structure and extending downwardly and rearwardly relative to all of said disintegrator elements, said guiding panel having a forward portion extending into the orbit of said rotary disintegrator elements and having passages formed therein through which said rotary elements may pass, and a plurality of laterally and rearwardly diverging guide elements carried upon the upper surface of said panel and extending upwardly therefrom, the disintegrated straw being positively propelled rearwardly and downwardly by said rotary disintegrator elements upon said panel and between said guide elements and being guided laterally by the latter to cause the same to be spread over a relatively wide area.

6. For use in the straw discharge portion of a harvesting machine having a conveyor for carrying straw in overlying relation thereto and in a rearward direction to its terminal discharge, a straw disintegrating and scattering device comprising a plurality of transversely spaced rotary disintegrator elements, structure for removably mounting said elements for rotation about an axis extending transversely across the discharge portion of such a machine with each of said elements in its overpassing arc swinging outwardly from the discharge end of such a conveyor substantially in the direction of travel of the straw being discharged therefrom and each propelling in substantially continuity of direction the outwardly traveling straw therefrom, a plurality of transversely spaced cooperating disintegrator elements mounted behind said mounting structure adjacent the rearwardmost parts of the discharge defining portions of the machine and extending forwardly therefrom into cooperating position with said rotary disintegrator elements to cooperatively disintegrate the stalks and straw when said rotary elements are rotated, said cooperating disintegrator elements being resiliently mounted and swingable downwardly to a position outside the orbit of said rotary disintegrator elements to permit unusually tough clumps of straw to pass therebetween and to be discharged without plugging the machine, and a straw guiding panel mounted below said cooperating disintegrator elements and adjacent thereto and extending downwardly and rearwardly relative thereto, said panel being readily removable from the machine to enable the user to use the machine in its original form for windrowing of the straw when desired, said guiding panel having a forward portion extending forwardly into the orbit of said rotary disintegrator elements and having passages formed through said forward portion through which said rotary elements pass while rotating, a plurality of laterally and rearwardly diverging guide elements carried upon the upper surface of said panel below said cooperating disintegrator elements and extending upwardly from the upper surface of said panel, the disintegrated straw being propelled downwardly upon the upper surface of said panel and between said guide elements by said rotary disintegrator elements after the straw has been disintegrated and being guided laterally by said guide elements to cause the same to be spread over a relatively wide area.

7. The structure defined in claim 6, said panel extending in a plane which extends at an angle exceeding 60 degrees relative to the length of said arms as they enter said passages.

References Cited in the file of this patent

UNITED STATES PATENTS

| | | |
|---|---|---|
| 1,259,089 | Felcyn | Mar. 12, 1918 |
| 2,670,775 | Elofson | Mar. 2, 1954 |

FOREIGN PATENTS

| | | |
|---|---|---|
| 354,186 | Germany | June 3, 1922 |